June 24, 1941.  L. LUPO  2,246,946
PLANTING, GARDENING, AND LANDSCAPING APPARATUS
Filed May 4, 1940  3 Sheets-Sheet 1
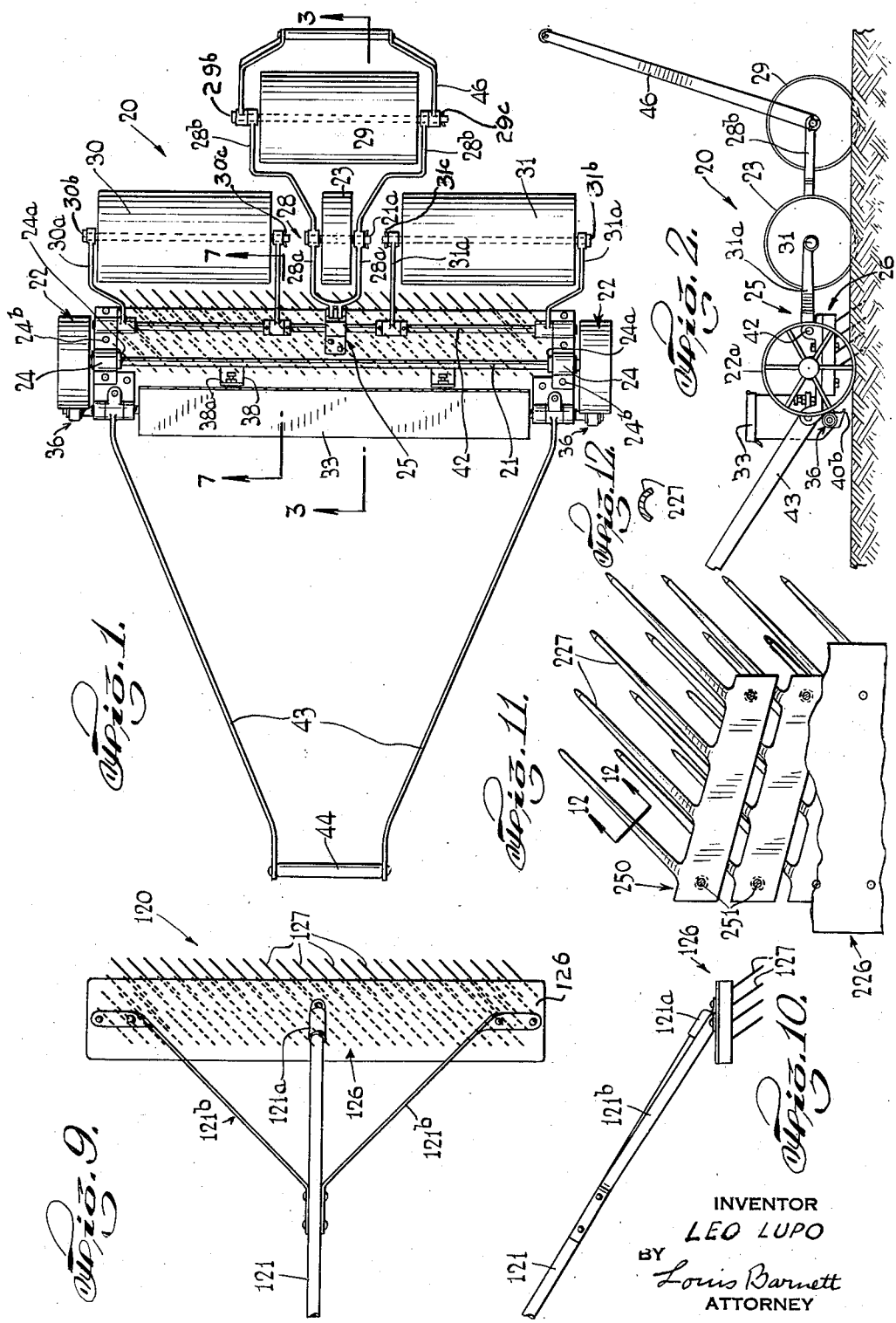
INVENTOR
LEO LUPO
BY
Louis Barnett
ATTORNEY

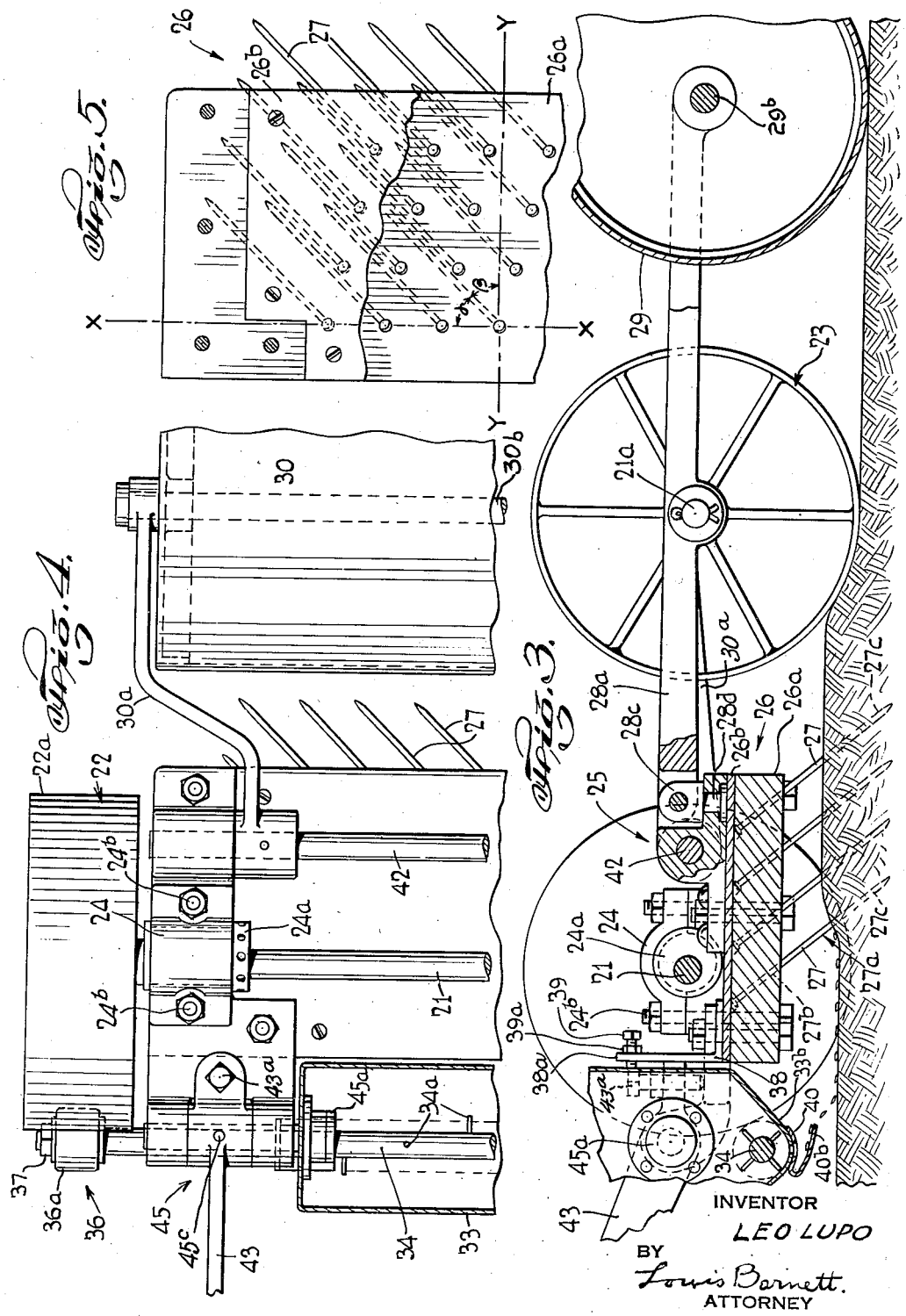

June 24, 1941. L. LUPO 2,246,946
PLANTING, GARDENING, AND LANDSCAPING APPARATUS
Filed May 4, 1940 3 Sheets-Sheet 3
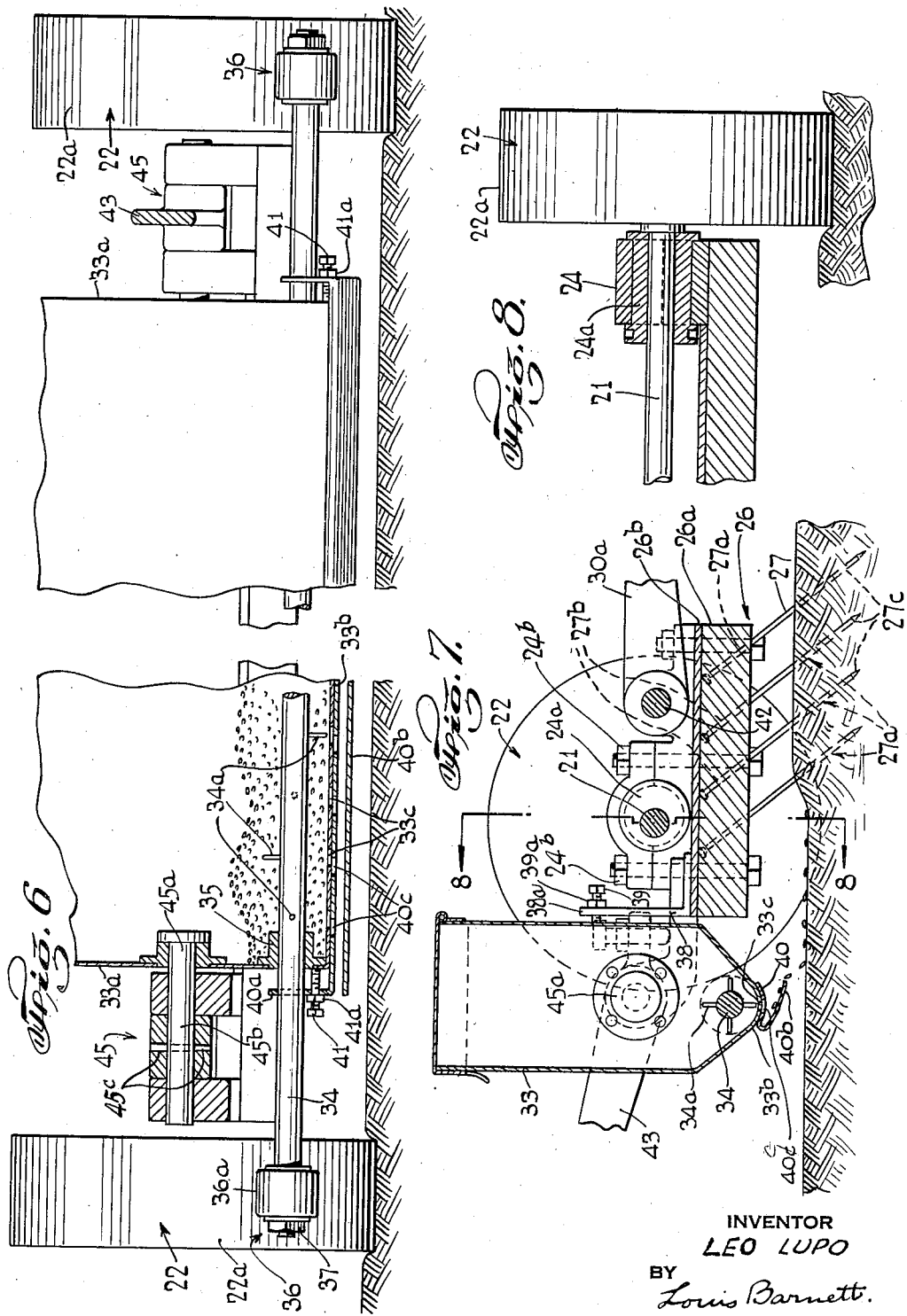
INVENTOR
LEO LUPO
BY
Louis Barnett.
ATTORNEY Patented June 24, 1941

2,246,946

UNITED STATES PATENT OFFICE 2,246,946

PLANTING, GARDENING, AND LANDSCAPING APPARATUS

Leo Lupo, New York, N. Y.

Application May 4, 1940, Serial No. 333,286

2 Claims. (Cl. 55—3)

This invention relates to apparatus and a novel method for planting, gardening and landscaping, and other like purposes. More particularly the invention is adapted for cultivating, conditioning and planting grass on lawns, parks, play fields and the like.

Among the objects of the invention is to improve apparatus of the character described which shall comprise few and readily assembled parts forming a compact rugged structure, which shall be inexpensive to manufacture, which shall be easy and simple to operate without requiring skilled or experienced labor, which shall be practical and highly efficient in use, and to an improved method which shall be simple to carry out for cultivating, conditioning and planting grass lawns and the like.

Another object of the invention is to save time in planting operation, economize on labor and material and prevent planted seeds from being washed away by rain and drying out, and to evenly distribute the seeds when turned under to lie more uniformly spaced at a desired depth than is possible otherwise. Thus, patchy growth in grass lawns are practically eliminated and the necessity of usual reseeding operation before such lawn is well established is avoided.

A further object of the invention permits the efficient and economical use thereof for turning under fertilizers in fluent form on soil or lawns requiring a top dressing of uniform shallow depth.

Still another object of the invention is to provide improvements used in the manner hereinafter described for cultivating purposes to eradicate weeds in truck farming, for shallow harrowing, and for aerating the soil.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

In the accompanying drawings, in which is shown various possible illustrative embodiments of this invention:

Figs. 1 and 2 are plan and side elevational views, respectively, of an apparatus constructed to embody the invention for use as a grass cultivator or the like;

Fig. 3 is a fragmentary part of a cross-section taken on lines 3—3 in Fig. 1;

Fig. 4 is a fragmentary enlarged plan view showing in detail the upper portion of that shown in Fig. 1;

Fig. 5 is a fragmentary plan view of the improved rake construction of the apparatus for seed planting shown in Figs. 1 to 3 embodying the invention;

Fig. 6 is a fragmentary enlarged front elevational view of the improved apparatus partly broken away to expose the interior construction of the seed and/or fertilizer feeder;

Figs. 7 and 8 are cross-sectional views taken on line 7—7 in Fig. 1 and line 8—8 in Fig. 7, respectively;

Figs. 9 and 10 are plan and side elevational views of a hand rake construction embodying the invention;

Fig. 11 is a fragmentary plan view of a modified construction of the improved rake head embodying the invention, adapted to be used in place of the rake construction shown in Fig. 5, and Fig. 12 is a cross-sectional view taken on line 12—12 in Fig. 11.

Referring in detail to the drawings, 20 denotes an apparatus of the character described constructed to embody the invention. Said apparatus 20 may include a suitable running gear or vehicle so that the apparatus may be moved about and operated either manually or attached to a power driven unit (not shown) in the well understood manner. As here shown the running gear includes an axle shaft 21 having rotatably mounted on each end thereof a spoked wheel 22 and another intermediate spoked wheel 23 located to turn on an axle shaft 21a spaced from the alignment of wheels 22 to provide a stable three point support as shown in Fig. 1.

Suspended from the axle shaft 21 by spaced hanger bearings 24 including fastening means, such as spaced bolts 24b, and located inwardly of and adjacent to wheels 22 and by a suitable coupling hanger bearing 25 spaced midway between the bearings 24, there is a rake head denoted generally at 26. The rake head 26 as shown in Figs. 3 and 5 may comprise a wood board or other suitable backing block 26a through which extend in parallelly aligned rows uniformly spaced teeth 27 preferably made of metal and arranged in staggered relation. The teeth 27 extend down obliquely in a rearward direction with respect to shaft 21 from the plane of said block 26a. As seen from Fig. 5 the axis of the teeth 27 not only extends rearwardly oblique by angle a with relation to a vertical plane extending the length of the rake head 26 (indicated by dot and dash lines X—X), but also obliquely as by angle β with relation to a vertical plane extending at right angles to the plane passing through X—X or the width of the said head 26 (indicated by dot and dash lines Y—Y). Angles α and β of approximately 45° have been found to give satisfactory results.

The teeth 27 preferably may be of circular cross-section to present a convex surface 27a facing forward for turning under the seeded prepared ground in the manner hereinafter described.

The rake head 26 also includes a cover plate 26b which may be of metallic sheeting extending over the upper side of the board 26a to prevent the anchored ends 27b of the teeth 27 in the board 26a from being pushed up. In normal position the free ends 27c of the rake teeth 27 extend down obliquely rearward and into the earth or soil a predetermined amount as shown in Figs. 2, 3 and 7, the extent of such insertion below the level of the ground being sufficient to cause turning under the top surface of the soil to a predetermined depth.

The coupling hanger bearing 25 may connect with a frame member 28 having spaced arms 28a between which is journalled the spoked wheel 23, said spaced arms being extended at 28b and spaced apart to accommodate a roller 29 which is rotatably carried therebetween. The coupling connection between the bearing 25 and frame member 28 may be swivelled at 28d and hinged at 28c so that the wheel 23 and roller 29 will more readily follow while turning, said running gear carrying the rake head 26 over uneven ground during the under turning operation of the apparatus 20.

Where the proportional length of the rake head 26 of the apparatus 20 with respect to the length of the roller 29 is such that the length of the roller 29 becomes too cumbersome or awkward to handle, the length of the roller 29 is made shorter and two additional similar rollers 30 and 31 are provided, the latter preferably being attached in spaced alignment on opposite sides of the wheel 23. The rollers 30 and 31 may be rotatably mounted between suitable frame arms 30a and 31a, respectively, which are hinged on an axle shaft 42. Said shaft 42 is mounted on the rake head 26 in spaced parallel alignment with shaft 21 as shown in Figs. 1 and 7.

For drawing the apparatus 20 along on the running gear, spaced draw bars 43 having the end thereof hinged on fitting 45 attached on the front side of rake head 26 may be provided. Said draw bars 43 may be terminated in a handle 44 for hand propulsion or a detachable coupling means of conventional construction may be provided where automotive power unit (not shown) is to be used in the well understood manner.

The swinging movement of said draw bar 43 may be limited by suitable means, such as adjustable bolts 43a, as shown in Figs. 3 and 4.

When it is desired to provide a unitary means for spreading seeds, fertilizer or the like, hereinafter referred to under the general term "planting material," as well as under turning such "planting material" into the soil, a container or receptacle 33 may be carried by the vehicle at the front end of the rake head 26, as shown in Figs. 3, 6 and 7. Said receptacle 33 may be trunnioned on inwardly extending and overhanging ends 45a of stub shafts 45b which form part of the spaced hinged fittings 45, said stub shafts 45b being secured by suitable pins 45c which pass through the end of draw bars 43 and said shaft 45b as shown in Figs. 4 and 6.

Extending through the receptacle 33 is a feed or stirrer shaft 34 having breaker or mixer pins 34a, said shaft 34 being journalled in suitable bearings 35 carried on the two ends 33a of the receptacle 33. Said shaft 34 extends through and beyond the receptacle end 33a and carries on each of the opposite ends thereof a roller 36 which preferably may have a rubber facing 36a, said rollers being secured to turn with the shaft 34 and retained by any suitable means as, for example, nuts 37. The alignment of the rubber faced rollers 36 is such as to be adjustable for bringing said rollers 36 in and out of rolling contact with the rims 22a of the spoked wheels 22. For said adjustment there is provided to upstand on the upper side of the rake plate 26b an angle iron 38 which carries suitable adjustable pressure means as, for example, the bolt 39 threaded through the upwardly extending side 38a of the angle iron 38. This bolt may have a locking nut 39a. To make the driving of the shaft 34 effective, the locking nut 39a is released and the bolt 39 screwed in for swinging the receptacle 33 on the trunnion above described. Thereby, the rubber faced rollers 36 are forced against the wheel rim 22a for rotation.

The bottom side 33b of the receptacle 33 may be provided with perforations 33c to permit "planting material" such as grass seeds, fertilizer or other fluent material (not shown) to pass therethrough in the well understood manner. In order to limit or control the amount of such fluent material to pass through, there is provided a sifter-plate 40 extending along said bottom side 33b, the opposite ends 40a of said plate 40 being supported on the shaft 34. The sifter-plate 40 may also be provided with openings and perforations 40c of the same size and spacing as the openings or perforations in 33b of the receptacle 33. Suitable means are provided for adjusting the alignment of the sifter-plate 40 with respect to the receptacle 33 as, for example, the cooperating screws 41 having lock nuts 41a, shown in Fig. 6. By moving the adjusting screws 41 the effective areas of the outlet openings 33c of the receptacle are controlled. Said sifter-plate 40 preferably is provided with downwardly extending chute portion 40b which extends along the entire length of the bottom side 33b of the receptacle 33 sloping down rearwardly to form a spreader so that the grass seeds, fertilizer and the like fluent material in passing from the receptacle 33 drops on the chute portion 40b and is spread over the surface of the ground on forward movement of the apparatus 20 thereover.

Since it may often be desirable to vary the depth in which the rake teeth 27 are to operate due to the nature and condition of the ground being worked on, there may be provided suitable means for raising or lowering the rake head 26 with respect to the ground as, for example, the provision of eccentric bushing 24a in hanger bearing 24 in which the shaft 21 is journalled. Thus, by rotating said eccentric bushing 24a in the pillow block of the bearing 24, the rake head 26 and teeth 27 carried on the shaft 22 are raised or lowered with respect to said axle shaft 22 and consequently with respect to the ground.

With the parts constructed as described above and assembled as shown in Figs. 1 to 8, inclusive, the improved device 20 may be used for seeding and planting a lawn or fertilizing a plot by simply putting in a supply of "planting material" such as grass seeds, fertilizer or the like fluent material in the receptacle 33 and drawing the apparatus 20 along the ground by means of the handle 44.

Referring now to Fig. 7, the operation of the apparatus 20 as it is drawn over the ground will be apparent. The mixer or stirrer on rotation of shaft 34 in the receptacle 33 breaks up any congestion of the material in the receptacle 33 at the outlet openings 33c and the "planting material" drops through said openings 33c on to the chute portion 40b and is spread on the ground. As the apparatus 20 is advanced, the teeth 27 of the rake head 26 are drawn through the covered ground and the top soil is given a twisting or turning action about each tooth whereby the top covering spread of "planting material" is turned under a predetermined desired amount, adjustment if found necessary being made by lowering or raising the rake head 26 and teeth 27 by means of the eccentric bushing. Preferably, the ground over which the apparatus 20 is operated when planting grass seeds is first harrowed and prepared to receive the seeds spread by apparatus 20 and is then in a suitable condition so that the teeth 27 turn under the seeds or fertilizer into the soil to a proper predetermined depth and uniformly distributed. Such planted seeds then lie in the most desirable position and in condition for growing. As so planted and rolled by rollers 29, 30, and 31, washing away by the rain or dry out is prevented.

The novel oblique arrangement of the rake teeth 27 with respect to the plane of the head of the rake is such that rake teeth 27 extend in a rearward oblique direction with respect to the advance movement of the apparatus 20 over the ground causing the soil in the region about each tooth as it is drawn therethrough to be given a twirl. The top "planting material" such as grass seeds or fertilizer to be buried is thus uniformly spread under the soil at a proper predetermined depth. The teeth 27 are staggered and located at such distance apart that the effectiveness of the operation of one tooth on the region thereabout is sufficient to abut or overlap the regions covered of the adjacent teeth so that the entire ground traversed by the raked teeth 27 is completely and evenly worked over.

After the under turn of the said "planting material" is completed by the rake head 26, the rollers 29, 30 and 31 which preferably are weighted, tamp the ground face down and leave the soil in a condition for promoting the growth of the planted seeds and preventing said "planting material" to be washed out by rain or excessive watering, as has already been explained.

Although the teeth 27 in rake head 26 are shown in Fig. 1 as extending in parallel alignment downwardly and in a direction toward the upper right hand corner, it is to be understood that said rake teeth 27 may equally well be constructed to extend downwardly and in a direction toward the lower right hand corner. In either construction the rake head will operate in the identical manner described above.

Where the ground is not too hard the apparatus 20 without the receptacle 33 may be used for shallow harrowing or preconditioning the soil such as aerating, in which case a suitable draft-handle 46 extended up from arms 28b is provided as shown in Fig. 1 attached to the roller 29. Drawing apparatus 20 over the ground by exerting a pulling force on draft handle 46, the rake teeth 27 will turn the soil on the ground over for preconditioning same or for other like service. In a like manner of operation as described above, if apparatus is moved over a weed growth, the latter will be uprooted and eradicated.

When using the apparatus 20 for harrowing, aerating or weeding as described above, the rollers 29, 30 and 31 may be disconnected and removed if desired. To this end shafts 29b, 30b and 31b carrying said rollers 29, 30 and 31 are provided with suitable end stopping means such as fastening cotter pins 29c, 30c and 31c which when removed from one end of each shaft permit the withdrawal of said shafts from their respective rollers. On the removal of the latter the rake head 26 is supported for movement on the running gear having spoked wheels 22 and 23.

In Figs. 9 and 10 a modified form of the invention in the form of a hand type rake 120 is shown. Here a suitable handle 121 is provided and may be attached to the rake head 126 by a fitting 121a and brace rods 121b, the teeth 127 being secured to extend from the rake head 126 in the same manner described above for rake head 26 and teeth 27. By the use of the hand rake 120 a simple stroking motion given the rake head 126 and teeth 127 will cause seeded surface spread on the soil engaged by said teeth 127 to be underturned to a uniform proper planting depth without requiring further operations or labor.

In Figs. 11 and 12 is shown another modified feature of the invention in the construction of a rake head 226 and teeth 227 made from a single plate stamping sections 250 instead of individual teeth anchored in the rake head shown in Figs. 3, 5 and 7. Here a plate section 250 forming the rake head 226 and the teeth 227 are integrally formed. When this construction is fabricated by stamping a steel or other suitable sheet material the location and spacing of the teeth 227 being as shown, the teeth 227 are adapted to be aligned with those assembled adjacent thereto being secured in position by suitable fastening means, such as rivets 251, so that every part of the ground passed over by the apparatus or instrument of the character described is taken care of and subjected to the turning under operation above described for rake head 26. It is to be understood that the rake head 226 and teeth 227 construction above described may be substituted for the rake head 26 or 126 and teeth 27 and 127 in the apparatus 20 and instrument 120 described above.

It will thus be seen that there is provided an apparatus and method in which the several objects of the invention are achieved and which is well adapted to meet the conditions of practical use.

As various other possible embodiments might be made of the above invention, and as various changes might be made in the embodiment above set forth, it is to be understood that all matters herein set forth or shown in the accompanying drawings and described in the specification are to be interpreted as illustrative and not in a limiting sense.

Having thus described my invention, I claim as new and desire to secure by Letters Patent:

1. In a device of the character described, a rake construction comprising a plurality of rows of uniformly spaced teeth arranged in staggered alignment, means formed with a surface plane for supporting consecutive rows of the teeth in the same plane with the direction of the axis of each tooth extending at an oblique angle with respect to said surface plane and at an oblique angle with respect to a plane extending at right angles with respect to said surface plane, and means for advancing said rake through a harrowed ground area spread initially with "planting material" on the soil surface of said area with said teeth extending in a direction away from the direction of said advancing movement of the rake for turning under successive portions of the surface soil spread with said "material" to a uniform depth below said initially spread position thereof, the staggered spacing and positioning relation of the rake teeth and said means being so constructed and arranged to effectuate said turning under a region about each tooth sufficient to abut like regions of the adjacent teeth so that the entire ground traversed in the advance movement of the teeth by said means is completely and evenly worked over.

2. In a device of the character described, a rake construction defined in claim 1 in which the perpendicular distance from the free ends of the teeth to said plane surface is substantially greater than the depth of the turning under of said "material" below the plane of said initial spread position thereof for permitting the free movement of the soil being turned under between the plane of said initial spread surface and the surface plane of said means.

LEO LUPO.